US 9,172,941 B2

(12) United States Patent
Sugimura (10) Patent No.: US 9,172,941 B2
(45) Date of Patent: Oct. 27, 2015

(54) MOVING IMAGE PROCESSING DEVICE AND MOVING IMAGE PROCESSING METHOD (75) Inventor: Akihiro Sugimura, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 636 days.

(21) Appl. No.: 13/154,718

(22) Filed: Jun. 7, 2011

(65) Prior Publication Data

US 2012/0069145 A1    Mar. 22, 2012

(30) Foreign Application Priority Data

Sep. 16, 2010 (JP) .................................. 2010-207971

(51) Int. Cl.
*H04N 15/00* (2006.01)
*H04N 13/00* (2006.01)

(52) U.S. Cl.
CPC ....... *H04N 13/0055* (2013.01); *H04N 13/0007* (2013.01); *H04N 13/0062* (2013.01)

(58) Field of Classification Search
CPC ............ H04N 13/0059; H04N 21/816; H04N 21/23605; H04N 21/43635; G09G 2370/12
USPC .......................................................... 348/43
See application file for complete search history.

(56) References Cited

U.S. PATENT DOCUMENTS

| | | | | |
|---|---|---|---|---|
| 2010/0289872 | A1* | 11/2010 | Funabiki et al. | 348/43 |
| 2011/0129198 | A1* | 6/2011 | Toma et al. | 386/239 |
| 2011/0149030 | A1* | 6/2011 | Kang et al. | 348/43 |
| 2011/0149032 | A1* | 6/2011 | Choi et al. | 348/43 |
| 2011/0150006 | A1* | 6/2011 | Unkel et al. | 370/503 |
| 2011/0285818 | A1* | 11/2011 | Park et al. | 348/43 |
| 2011/0292170 | A1* | 12/2011 | Jain | 348/43 |

FOREIGN PATENT DOCUMENTS

| | | |
|---|---|---|
| JP | 2011-77785 | 4/2011 |
| JP | 2012-49933 | 3/2012 |
| WO | 2010/131313 | 11/2010 |

OTHER PUBLICATIONS

HDMI standard 1.4a Published: Mar. 4, 2010.*
Notification of Reason(s) for Refusal dated Aug. 7, 2012, from corresponding Japanese Application No. 2010-207971.

* cited by examiner

*Primary Examiner* — Andy Rao
*Assistant Examiner* — Jared Walker
(74) *Attorney, Agent, or Firm* — Katten Muchin Rosenman LLP (57) ABSTRACT

A moving image processing device is configured such that a frame data acquisition unit configured to acquire frame data in which a parallax image for the left eye and a parallax image for the right eye are arranged across an active space. An image processing unit configured to subject the frame data to image processing. An active space setting unit configured to identify the position of the active space processed by the image processing unit and to set the pixel values of the active space to be fixed values.

5 Claims, 11 Drawing Sheets

| VIC | POINT OF ORIGIN DISPLAYED | | DISPLAYED SIZE OF PARALLAX IMAGE | | POINT OF ORIGIN OF ACTIVE SPACE | | SIZE OF ACTIVE SPACE | | TOTAL SIZE | |
|---|---|---|---|---|---|---|---|---|---|---|
| | x1 (pix) | y1 (line) | x2 (pix) | y2 (line) | x3=x1 (pix) | y3 (line) | x4=x2 (pix) | y4 (line) | 1H (pix) | 1V (line) |
| 1 | | | | | | | | | | |
| 2 | | | | | | | | | | |
| 3 | | | | | | | | | | |
| 4 | 260 | 25 | 1280 | 720 | 260 | 745 | 1280 | 30 | 1650 | 1500 |
| 5 | | | | | | | | | | |
| ... | | | | | | | | | | |
| 65 | | | | | | | | | | |

34

MOVING IMAGE PROCESSING DEVICE AND MOVING IMAGE PROCESSING METHOD

BACKGROUND OF THE INVENTION

1. Field of the Invention

The present invention relates to moving image processing devices and moving image processing methods and, more particularly, to a moving image processing device and method adapted for stereoscopic images.

2. Description of the Related Art

Recently, 3-dimensional display devices like three dimensional (3D) television sets capable of presenting stereoscopic videos or 3-dimensional video playback devices such as Blu-ray (registered trademark) players for playing back stereoscopic images are becoming available to ordinary users. A variety of signal processes and image processes such as coding or decoding of videos, change of image size, dithering, and format conversion are performed in a 3-dimensional display devices and 3-dimensional video playback devices.

Standards designed for connection between a display device and a video playback device and adapted for delivering 3-D videos are formulated (HDMI1.4a standard, see http://www.hdmi.org/press/press_release.aspx?prid=120). Standards like this stipulate a format for delivering and storing 3-D images.

When the 3-D video is subjected to image processing and does not meet the standard as a result, a problem is caused in that the video is not properly delivered or displayed. Another possible problem is that the video that does not meet the standard may lose compatibility in the future. For this reason, there is called for a technology of ensuring that the 3-D video subjected to image processing meets the standard.

SUMMARY OF THE INVENTION

The present invention addresses the aforementioned issue and a purpose thereof is to provide a technology of ensuring that the 3-D video subjected to image processing meets the standard.

The device according to one embodiment of the present invention addressing the above-mentioned issues is a moving image processing device. The moving image processing device comprises: a frame data acquisition unit configured to acquire frame data in which a parallax image for the left eye and a parallax image for the right eye are arranged across an active space; an image processing unit configured to subject the frame data to image processing; and an active space setting unit configured to identify the position of the active space processed by the image processing unit and to set the pixel values of the active space to be fixed values.

Another embodiment of the present invention relates to a moving image processing method. The moving image processing method is configured to cause a process to perform a process comprising: acquiring frame data in which a parallax image for the left eye and a parallax image for the right eye are arranged across an active space; subjecting the frame data to image processing; and identifying the position of the active space in the frame data subjected to image processing and setting the pixel values of the active space to be fixed values.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

A summary of the first embodiment will be given. A moving image processing device 100 according to the first embodiment acquires frame data in which a parallax image for the left eye and a parallax image for the right eye are arranged across an active space. The moving image processing device 100 identifies the position of an active space within the frame data and sets the pixel values of the active space at predetermined fixed values. For identification of the position of the active space, the moving image processing uses a coordinate system using a vertical synchronization signal and a horizontal synchronization signal as references.

Figure 1:
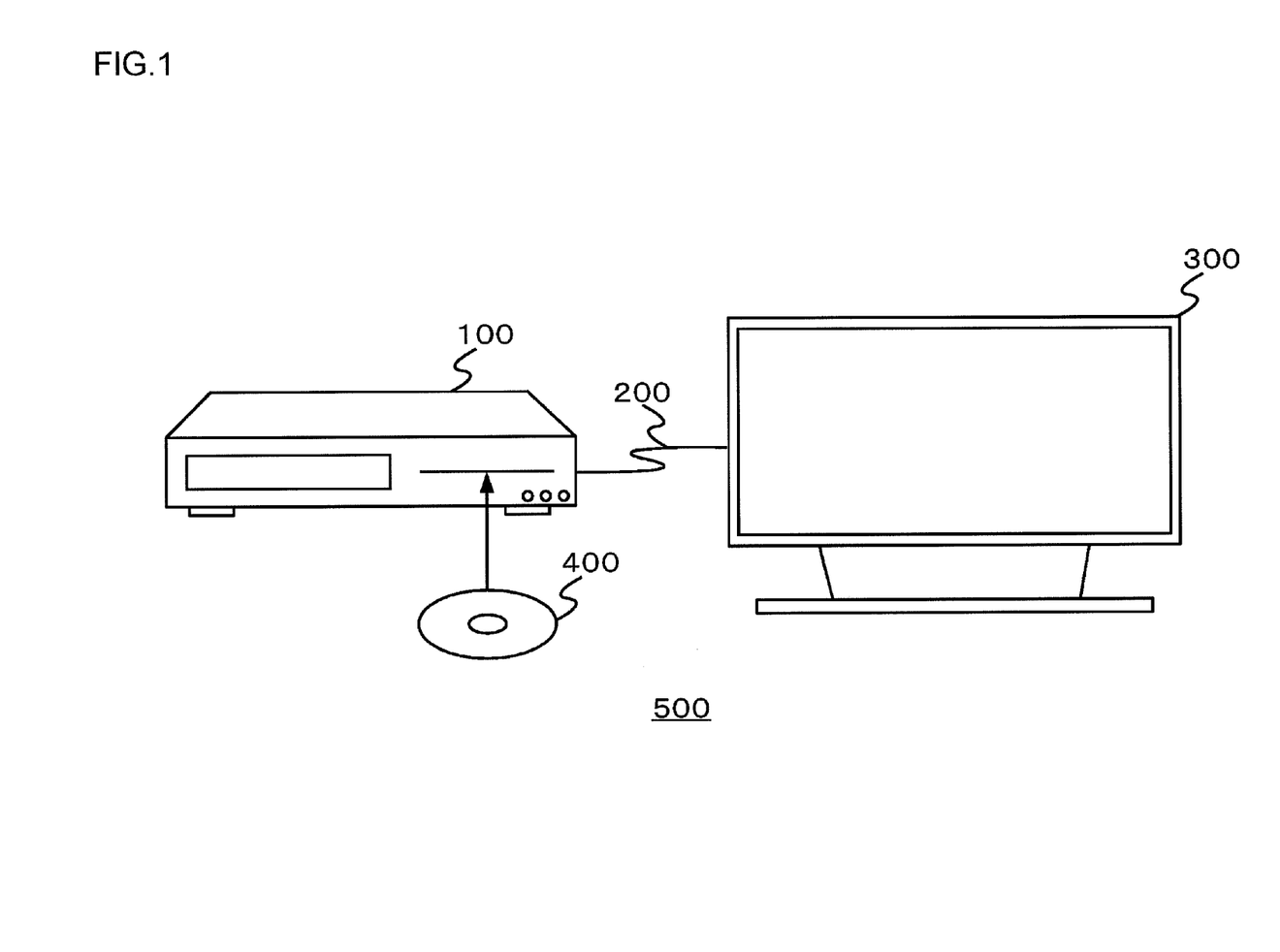
FIG. 1 schematically shows a moving image playback system according to the first embodiment.

FIG. 1 schematically shows a moving image playback system 500 according to the first embodiment. The moving image playback system 500 includes a moving image processing device 100 and a display device 300.

For example, the moving image processing device 100 processes moving images stored in a recording medium such as a Blu-ray disk (registered trademark) 400. For example, the moving image processing device 100 is a Blu-ray player or a desktop game device. In this specification, the moving image processed by the moving image processing device 100 is a stereoscopic image including a parallax image for the left eye and a parallax image for the right eye. The display device 300 is connected to the moving image processing device 100 via a High-Definition Multimedia Interface (HDMI) cable 200 and displays a stereoscopic image output from the moving image processing device 100. The display device 300 may be a three-dimensional television.

Figure 2:
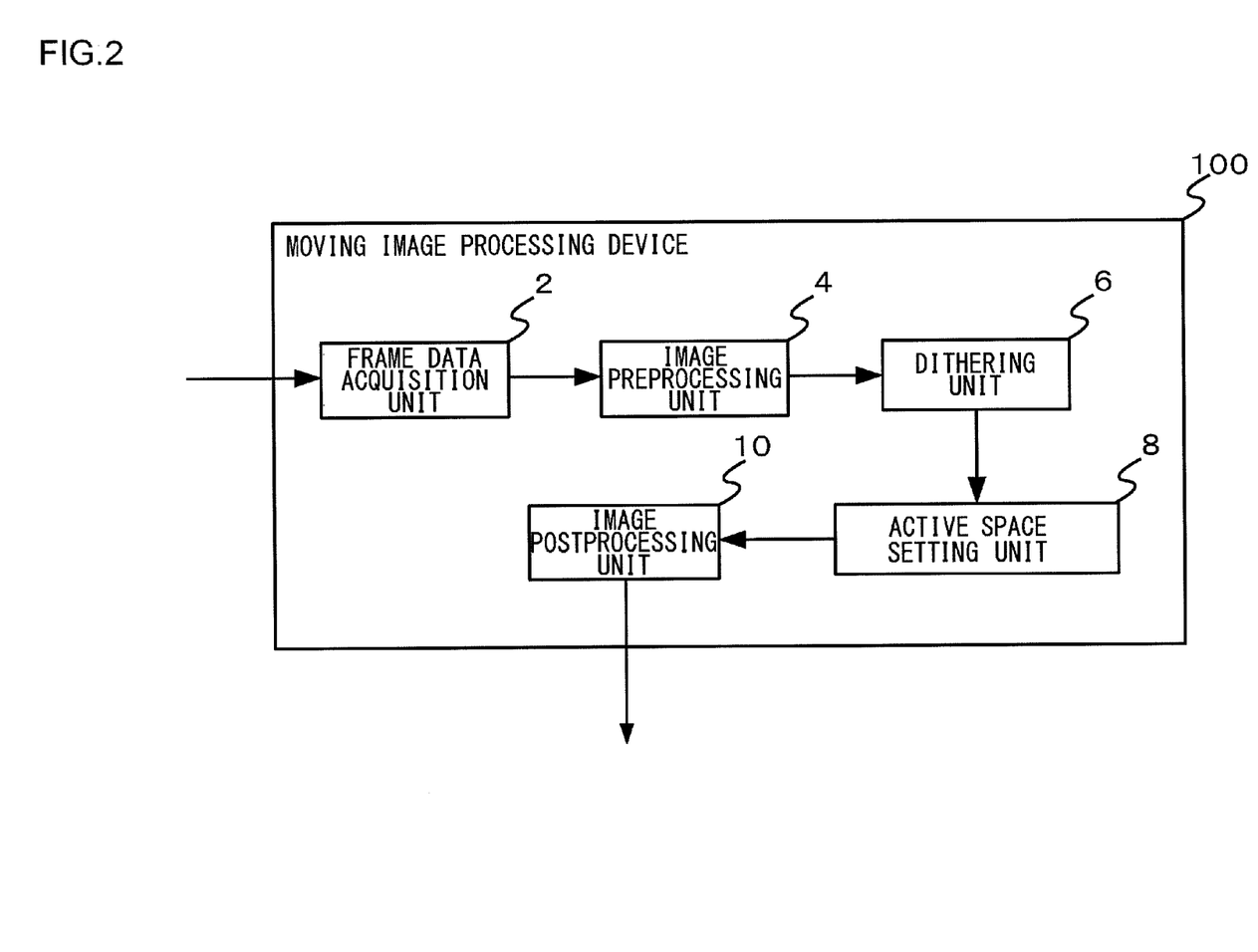
FIG. 2 schematically shows the functions of the moving image processing device according to the first embodiment.

FIG. 2 schematically shows the functions of the moving image processing device 100 according to the first embodiment. The moving image processing device 100 includes a frame data acquisition unit 2, an image preprocessing unit 4, a dithering unit 6, and an active space The frame data acquisition unit 2 acquires frame data in which a parallax image for the left eye and a parallax image for the right eye are arranged across an active space by, for example, reading the data from a Blu-ray disk 400. The term "active space" refers to an area provided between a plurality of sets of image data linked to form a single image. In 3-dimensional frame packing, a standard for recording and distribution of 3-dimensional moving images stipulated in the HDMI1.4a standard, an active space is provided between a parallax image for the left eye and a parallax image for the right eye. An active space according to the HDMI standard 1.4a is like a "margin for stitching" used to secure time for switching between the parallax image for the left eye and the parallax image for the right eye in the display device 300 such as a 3-dimensional television set.

The image preprocessing unit 4 applies various preprocessing such as color space conversion to the frame data acquired by the frame data acquisition unit 2. Details of the image preprocessing unit 4 will be given later. The dithering unit 6 applies a dithering process to the preprocessed frame data output by the image preprocessing unit 4. The dithering unit 6 may use a fixed dither for the successively input frame data. Alternatively, the dithering unit 6 may use different dithers for different sets of frame data. The image preprocessing unit 4 and the dithering unit 6 operate as image processing units configured to perform image processing on the frame data acquired by the frame data acquisition unit 2.

The image preprocessing unit 4 and the dithering unit 6 process the frame data in units of pixels. As mentioned above, the frame data includes the parallax image for the left eye, the parallax image for the right eye, and the active space. However, the image preprocessing unit 4 and the dithering unit 6 make no distinction between these and process the frame data as a whole. As a result, the pixel values of the active space may exhibit variance. The term "variance in the pixel values of the active space" not only refers to variance in the pixel values of the active space in a given set of frame data but also refers to the pixel values of active spaces in the successively input frame data. In other words, the term refers to spatial and temporal variance in the pixel values of the active space.

For example, the HDMI standard 1.4a stipulates that the pixel values of the active space in 3D frame packing should be fixed spatially and temporally. Therefore, variance in the pixel values of the active space in the frame data output by the moving image processing device 100 may result in images not being displayed as intended or loss of compatibility.

In this respect, an active space setting unit 8 identifies the position of an active space within the frame data processed by the image preprocessing unit 4 and the dithering unit 6 and sets the pixel values of the active space at fixed values. Identification of an active space by the active space setting unit 8 will be described in detail later. By allowing the active space setting unit 8 to set the pixel values of the active space at fixed values, the requirement for an active space in HDMK1.4a continues to be met even after the frame data for 3-dimensional image is subject to image processing.

The image postprocessing unit 10 subjects the frame data output by the active space setting unit 8 to postprocessing such as encryption. Details of the image postprocessing unit 10 will be given later.

Figure 3:
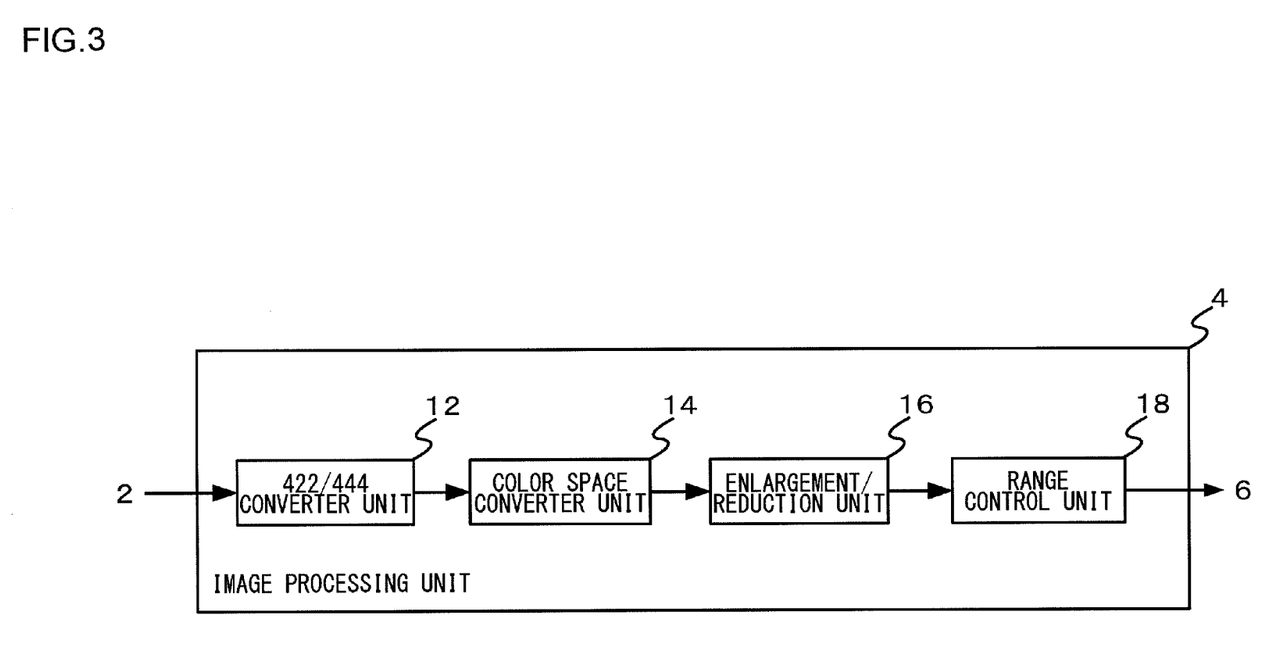
FIG. 3 schematically shows exemplary functional blocks of the image preprocessing unit according to the first embodiment.

FIG. 3 schematically shows exemplary functional blocks of the image preprocessing unit 4 according to the first embodiment. The image preprocessing unit 4 includes a 422/444 converter unit 12, a color space converter unit 14, an enlargement/reduction unit 16, and a range control unit 18.

A digital video signal such as a parallax image for the left eye and a parallax image for the right eye includes signals for three primary colors including red (R), green (G), and blue (B). Alternatively, a digital video signal includes component signals such as a luminance signal Y, and color difference signals Cb and Cr. Human eyes are known to be less sensitive to variation in the color difference signals Cb and Cr as compared with variation in the luminance signal Y. Therefore, reduction of the data for the color signals Cb and Cr to curtail the volume of information would present less of a problem than reducing the data for the luminance signal Y. Thus, the data for the color difference signals Cb and Cr may be reduced so as to reduce the volume of data.

The format occurring when the data for the color difference signals Cb and Cr is reduced to half that of the data for the luminance signal Y will be referred to as a YCbCr422 format, and the format occurring when the data for the color difference signals Cb and Cr is not reduced will be referred to as a YCbCr444 format. The 422/444 converter unit 12 generates frame data of the 444 format by subjecting the frame data in the 422 format acquired by the frame data acquisition unit 2 to a known interpolation process such as linear interpolation.

The color space converter unit 14 converts the frame data in the 444 format output by the 422/444 converter unit to signals of three primary colors R, G, and B. Details will be omitted, but the above steps can be implemented by addition and subtraction involving a known 3×3 matrix and a constant.

To display a video on low-resolution display device 300, the enlargement/reduction unit 16 changes the size of the frame data comprising signals of three primary colors R, G, and B output by the color space converter unit 14 as necessary. The range control unit 18 sets the dynamic range of the frame data output by the enlargement/reduction unit 16. More specifically, the range control unit 18 converts signals having values of a range 0-255 output from the enlargement/reduction unit 16 into signals having values of a range 16-235.

Figure 4:
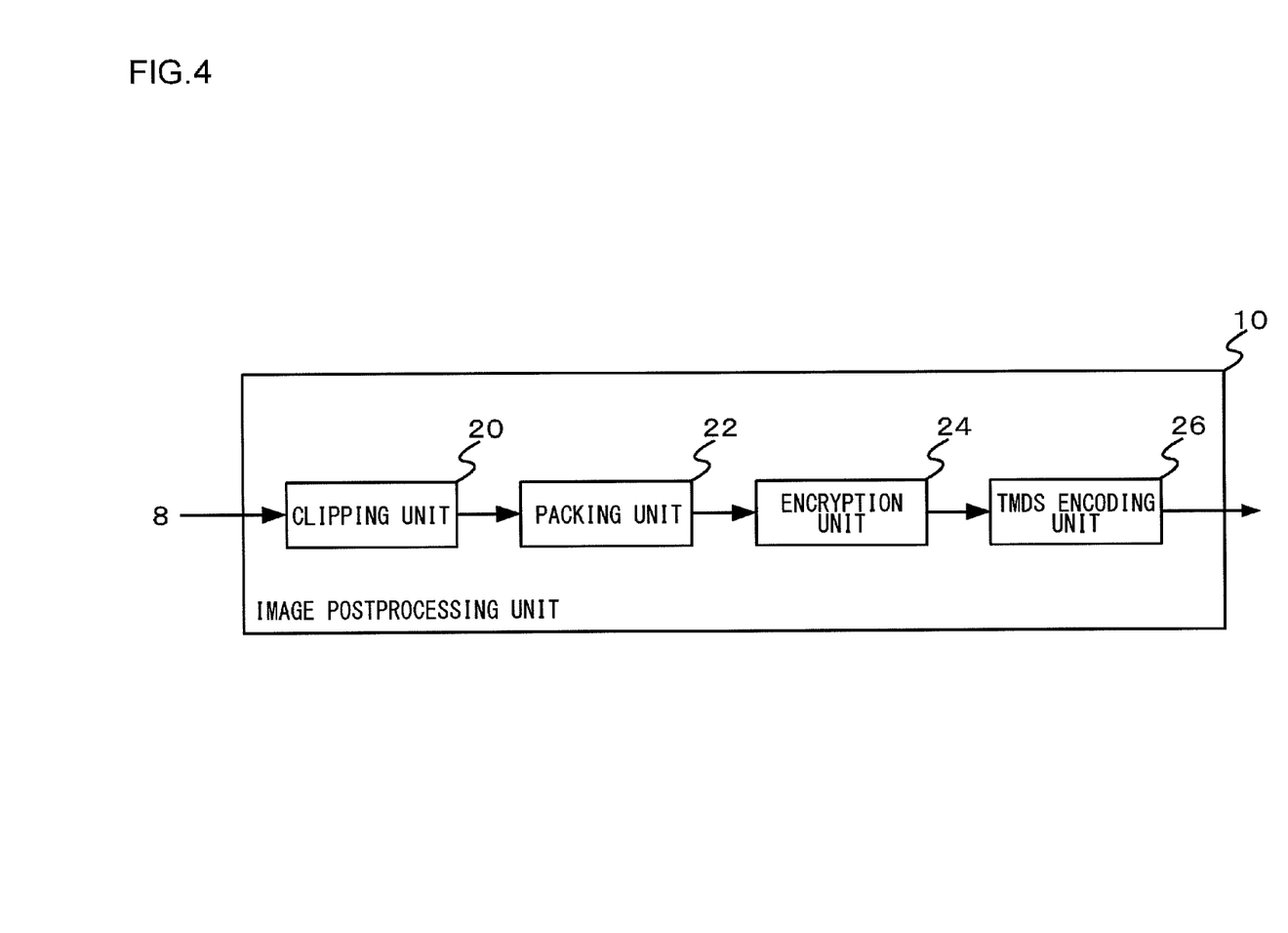
FIG. 4 schematically shows exemplary functional blocks of the image processing unit according to the first embodiment.

FIG. 4 schematically shows exemplary functional blocks of the image postprocessing unit 10 according to the first embodiment. The image postprocessing unit 10 includes a clipping unit 20, a packing unit 22, an encryption unit 24, and a transition minimized differential signaling (TMDS) encoding unit 26.

As mentioned above, a dither, which is a type of noise, is added to the frame data by the dithering unit 6. Therefore, the pixel values outside the dynamic range set by the range control unit 18 may be generated. Therefore, the clipping unit 20 clips the pixels values of the frame data output by the active space setting unit 8 so that the pixel values of the frame data are within a predetermined dynamic range.

More specifically, given that the dynamic range of the frame data is 8 bits, the clipping unit 20 accommodates the pixel values of the frame data in a range 16-235. By arranging the clipping unit 20 subsequent to the dithering unit 6 and the active space setting unit 8, it is possible to accommodate the pixel values of the frame data within a certain dynamic range.

As described above, the units as described above process data in units of pixels. In this respect, the packing unit 22 arranges the pixel values successively acquired from the clipping unit 20 and generates data of a format comprising signals for three primary colors, which is one of the formats defined in the HDMI1.4a standard.

The encryption unit 24 encrypts the data generated by the packing unit 22. For example, the frame data is in accordance with the HDMI1.4a standard, the encryption unit 24 outputs data subjected to encryption used in high-bandwidth digital content protection (HDCP). The TMDS encoding unit 26 encodes the data output by the encryption unit 24 in a signal transmission scheme based on TMDS.

FIGS. 2, 3, and 4 show functional blocks implementing the moving image processing device 100 according to the first embodiment, and the other features are omitted. The elements depicted in FIGS. 2, 3, and 4 as functional blocks for performing various processes are implemented in hardware such as a central processing unit (CPU), main memory, or other LSI's, and in software such as a program etc., loaded into the main memory. Therefore, it will be obvious to those skilled in the art that the functional blocks may be implemented in a variety of manners by hardware only, software only, or a combination of thereof.

Figure 5:
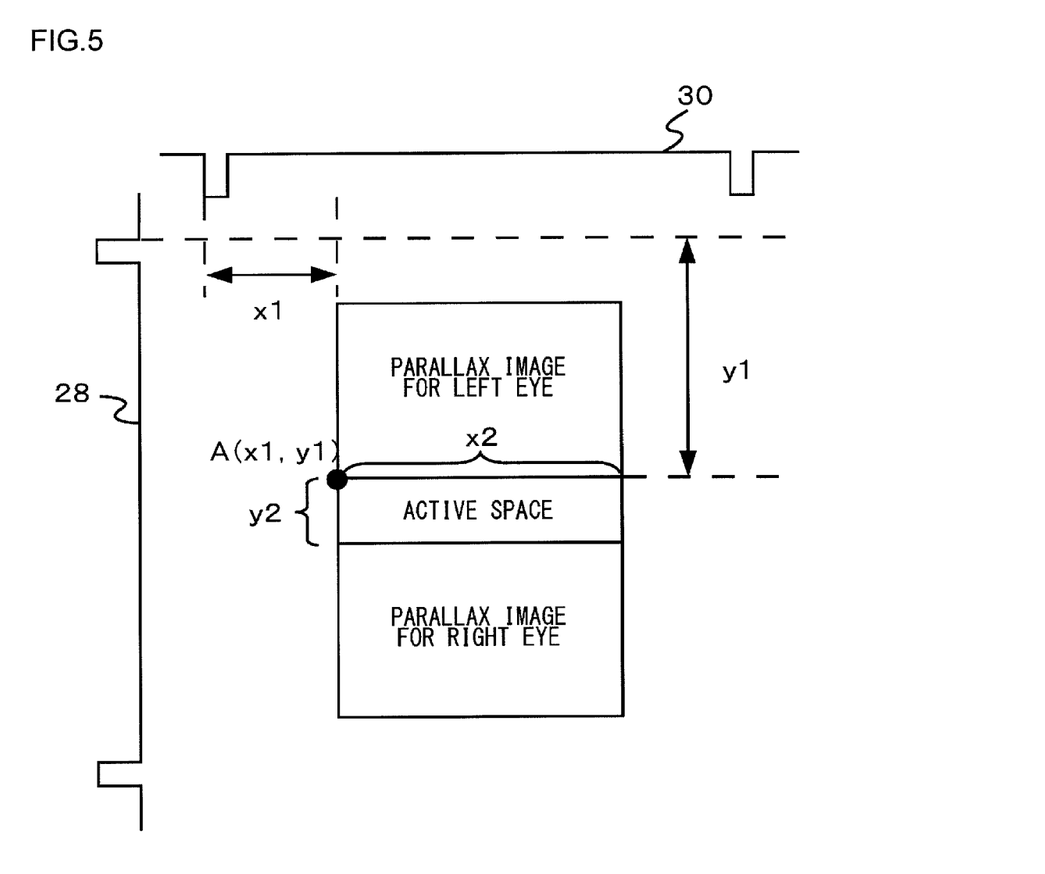
FIG. 5 shows the principle of identifying the position of an active space according to the first embodiment.

FIG. 5 shows the principle of identifying the position of an active space according to the first embodiment.

Generally, the coordinates of a position are defined in a video signal with reference to a vertical synchronization signal (hereinafter, referred to as "Vsync") 28 and a horizontal synchronization signal (hereinafter, referred to as "Hsync") 30. According to the first embodiment, the position of an active space is identified with reference to Vsync 28 and Hsync 30.

As shown in FIG. 5, it is given that the width of the active space is x2 [pixels], the height is y2, and the coordinates of a starting point A of the active space is (x1, y1). When the x1-th pixel in the y1-th line is input, the active space setting unit 8 identifies x2×y2 pixels that follow as pixels in the active space and sets the pixel values of the identified pixels at fixed values. Therefore, the parameters required to identify the position of an active space according to the first embodiment include x1 [pixels] from Hsync=0 indicating the starting position of the frame data, y1 [lines] from Vsync=0 indicating the starting line of the active space, x2 [pixels] indicating the width of the active space, and y2 [lines] indicating the height of the active space. The fixed values of the pixel values defined in the active space are also necessary as parameters.

Figure 6:
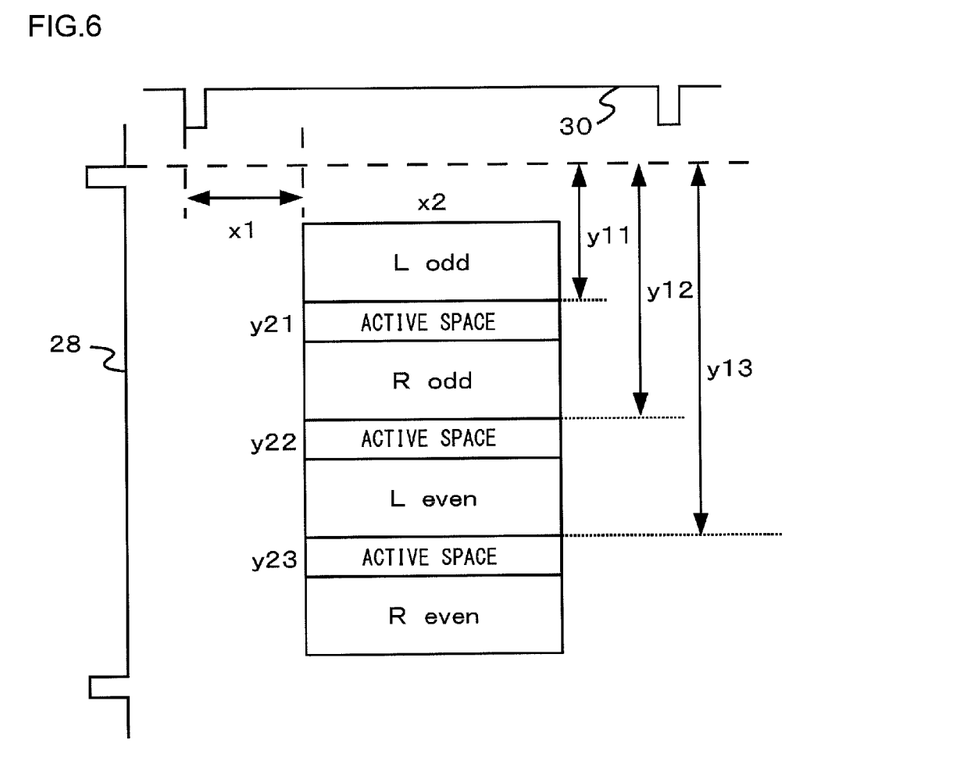
FIG. 6 shows a case where a plurality of active spaces are located.

FIG. 6 shows a case where a plurality of active spaces are located. FIG. 6 shows an example of 3D frame packing used for interlace display. Referring to FIG. 6, "L odd", "R odd", "L even", and "R even" indicate "odd-numbered line of the parallax image for the left eye", "odd-numbered line of the parallax image for the right eye", "even-numbered line of the parallax image for the left eye", and "even-numbered line of the parallax image for the right eye", respectively.

In the case where there are a plurality of active spaces, as in the case of a single active space, the active space setting unit 8 identifies the position of each active space with reference to Vsync 28 and Hsync 30. Since the active spaces normally have the identical width, the parameters indicating the starting line of the active space and the height of the active space increase in association with the number of active spaces.

Figure 7:
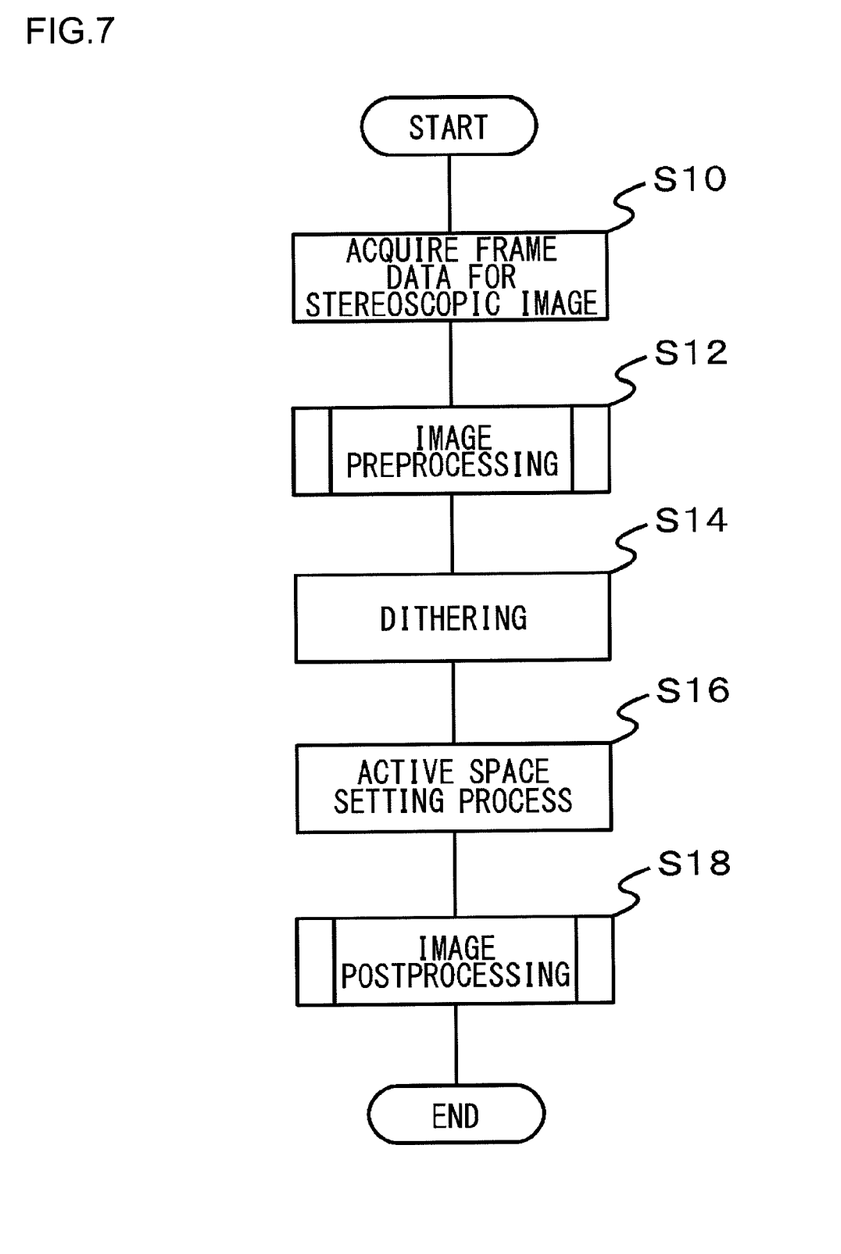
FIG. 7 is a flowchart showing the flow of the process in the moving image processing device according to the first embodiment.

FIG. 7 is a flowchart showing the flow of the process in the moving image processing device 100 according to the first embodiment. Referring to the flowcharts in the following figures, the steps in the respective components are denoted by a combination of S (initial letter of Step), which indicates "step", and a numeral. The process of the flowchart is started when the moving image processing device 100 is started.

The frame data acquisition unit 2 acquires frame data in which a parallax image for the left eye and a parallax image for the right eye are arranged across an active space (S10). The image preprocessing unit 4 subjects the frame data for a stereoscopic image acquired by the frame data acquisition unit 2 to preprocessing such as 422/444 conversion (S12).

The dithering unit 6 subjects the preprocessed frame data output by the image preprocessing unit 4 to a dithering process (S14). The active space setting unit 8 identifies the position of an active space within the frame data processed by the image preprocessing unit 4 and the dithering unit 6 and sets the pixel values of the active space at fixed values (S16). The image postprocessing unit 10 subjects the frame data output by the active space setting unit 8 to postprocessing such as encryption (S18).

Figure 8:
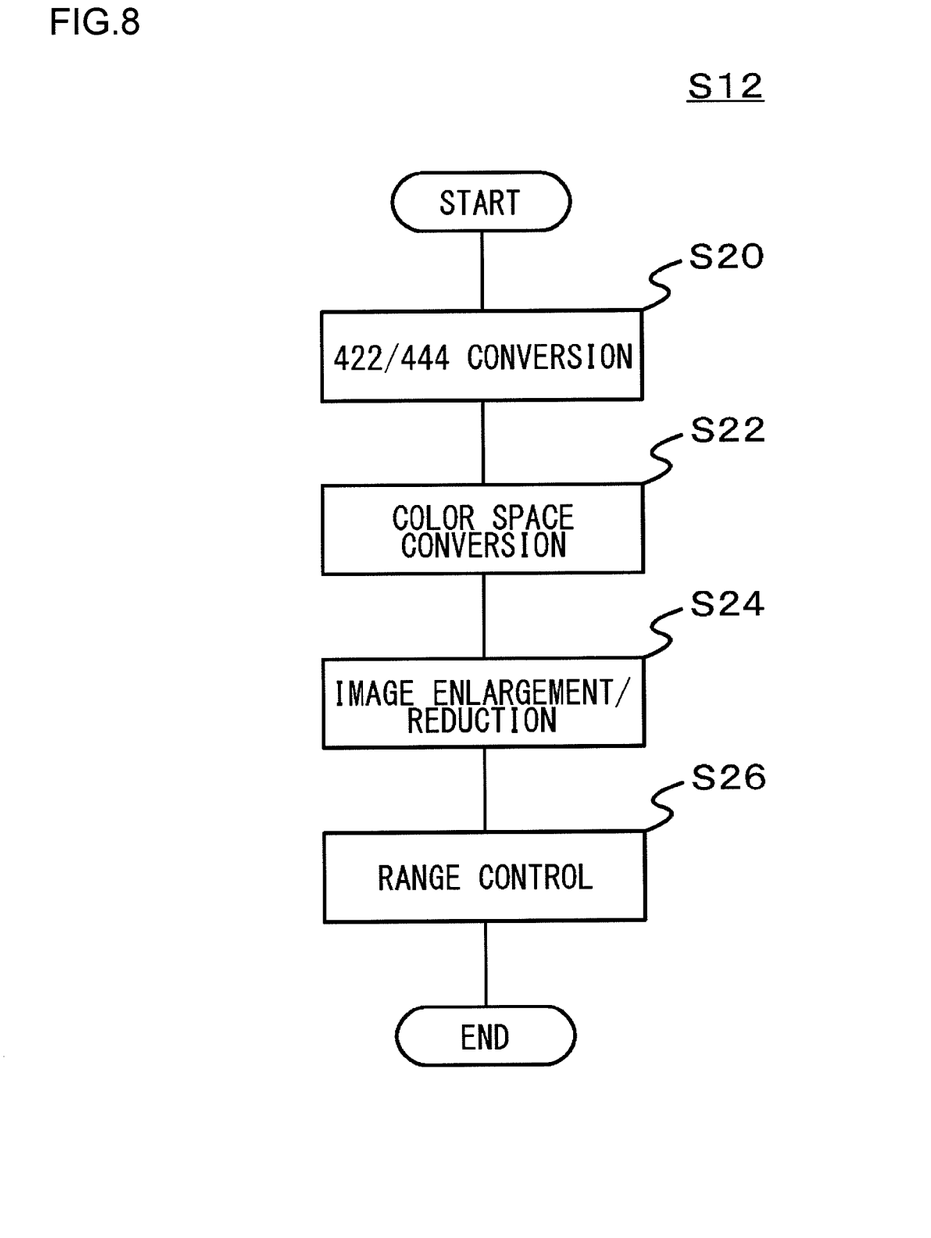
FIG. 8 is a flowchart showing the flow of the process in the image preprocessing unit according to the first embodiment.

FIG. 8 is a flowchart showing the flow of the process in the image preprocessing unit 4 according to the first embodiment and shows the detail of step S12 in FIG. 7.

The 422/444 converter unit 12 generates frame data of the 444 format by subject the frame data in the 422 format acquired by the frame data acquisition unit 2 to a known interpolation process such as linear interpolation. The color space converter unit 14 converts the frame data in the 444 format output by the 422/444 converter unit to signals of three primary colors R, G, and B (S22).

The enlargement/reduction unit 16 changes the size of the frame data comprising signals of three primary colors R, G, and B output by the color space converter unit 14 (S24) when needed. The range control unit 18 sets the dynamic range of the frame data output by the enlargement/reduction unit 16 (S26).

Figure 9:
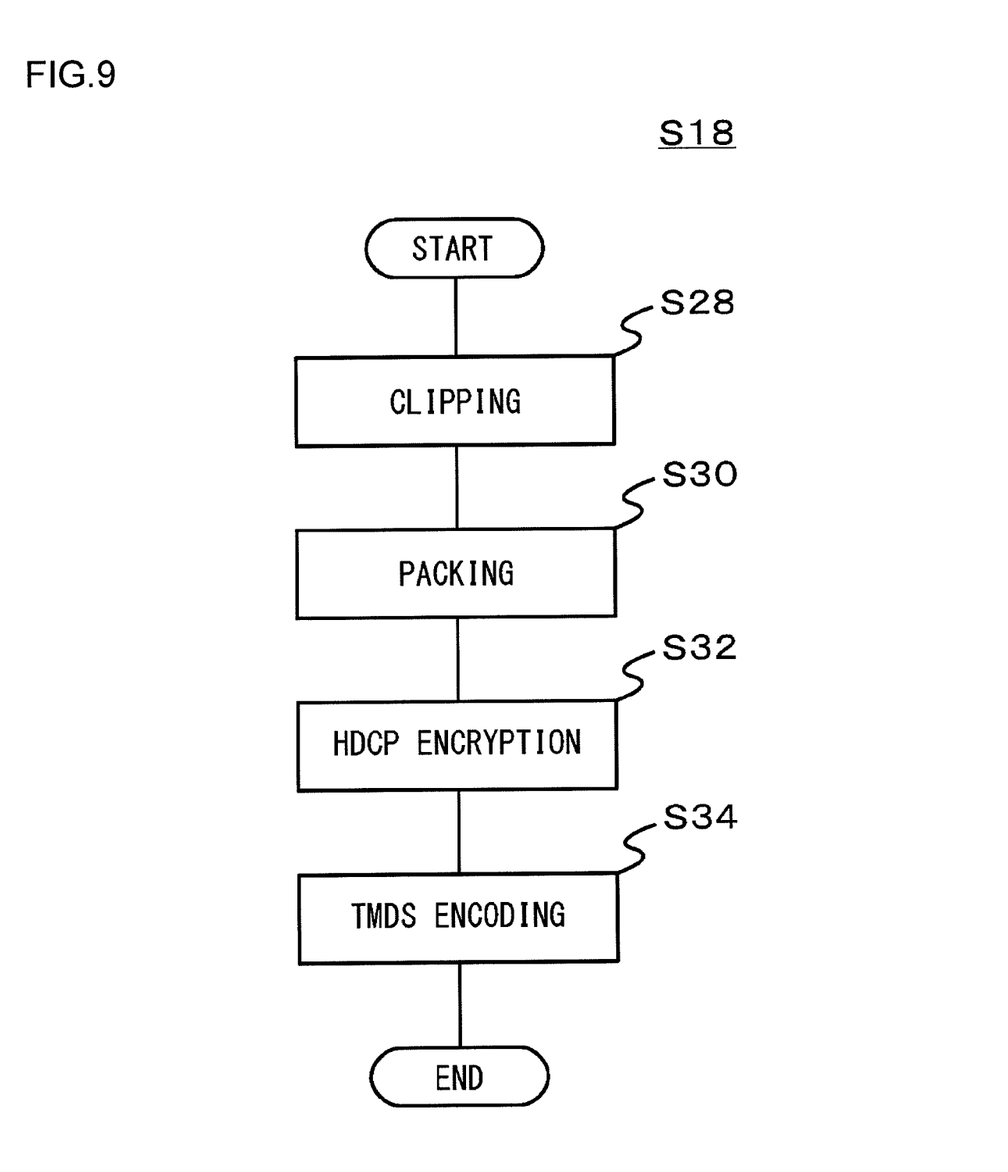
FIG. 9 is a flowchart showing the flow of the process in the image postprocessing unit according to the first embodiment.

FIG. 9 is a flowchart showing the flow of the process in the image postprocessing unit 10 according to the first embodiment and shows the detail of step S18 in FIG. 7.

The clipping unit 20 clips the pixels values of the frame data output by the active space setting unit 8 so that the pixel values of the frame data are within a predetermined dynamic range (S28). The packing unit 22 arranges the pixel values successively acquired from the clipping unit 20 and generates data of a format comprising signals for three primary colors (S30).

The encryption unit 24 subjects the data generated by the packing unit 22 to an encryption process used in HDCP (S32). The TMDS encoding unit 26 encodes the data output by the encryption unit 24 in a signal transmission scheme based on TMDS (S34).

The operation according to the configuration above is as follows. When the user plays back a stereoscopic image using the moving image processing device 100 according to the embodiment, the active space setting unit 8 identifies the position of the active space in the frame data and sets the pixel values of the active pace at predetermined fixed values.

As described above, the moving image processing device 100 according to the first embodiment provides a technology of ensuring that the 3-dimensional video subjected to image processing meets the HDMI1.4a standard. By identifying the position and size of an active space using coordinates, variation in the size of an active space or a parallax image or associated variation in the positional coordinates of the active space can be flexibly addressed.

Second Embodiment

A description will now be given of the second embodiment. Like the moving image processing device 100 according to the first embodiment, the moving image processing device 100 according to the second embodiment acquires frame data in which a parallax image for the left eye and a parallax image for the right eye are arranged across an active space. The moving image processing device 100 identifies the position of an active space within the frame data and sets the pixel values of the active space at predetermined fixed values. The difference from the first embodiment is that the second embodiment identifies the position of an active space by using a data enable signal (hereinafter, referred to as "DE") indicating that the pixels of the frame data are input. Hereinafter, the description that is a repetition from the first embodiment will be omitted or simplified.

Figure 10:
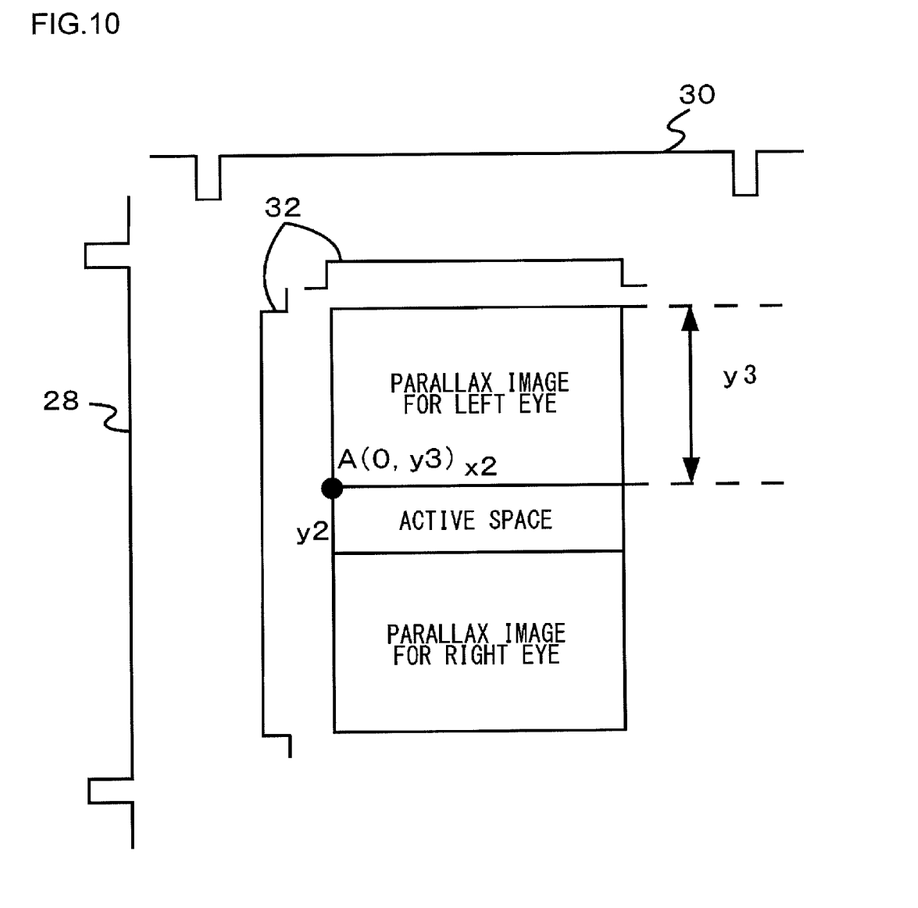
FIG. 10 shows the principle of identifying the position of an active space according to the second embodiment.

FIG. 10 shows the principle of identifying the position of an active space according to the second embodiment.

As shown in FIG. 2, an active space is a rectangular area sharing one side each with the parallax image for the left eye and the parallax image for the right eye. The signal denoted by a symbol 32 is DE. The data in compliance with the HDMI1.4a standard is provided with DE. Unlike Vsync and Hsync, DE 32 is a signal indicating the frame data, which represents an area excluding a vertical blank period or a horizontal blank period. In other words, a point of origin of DE 32 is aligned with the starting point of the frame data.

Thus, the active space setting unit 8 successively processes the frame data in units of pixels such that the active space setting unit 8 identifies the position of an active space with reference to the point of origin of DE 32 indicating that the pixels of the frame data are input. More specifically, it is given, referring to FIG. 10, that the width of the active space is x2 [pixels], the height is y2. With reference to the point of origin of DE 32, the coordinates of a starting point A of the active space is given by A(0, y3), using y3 [lines] indicating the height of the parallax image for the left eye and the parallax image for the right eye. The active space setting unit 8 identifies, as an active space, a rectangular area with a diagonal line defined by a point (0, y3) and a point (x2, y3+y2) at both ends. The active space setting unit 8 sets the pixel values of the pixels at predetermined fixed values. The width x2 [pixels] of the active space matches the width x3 [pixels] of the parallax image.

Therefore, the parameters required to identify the position of an active space according to the second embodiment include x3 (=x2) [pixels] indicating the width of the parallax image, y3 [lines] indicating the height of the parallax image, and y2 [lines] indicating the height of the active space. By using DE, the number of parameters required to identify the position of an active space is reduced as compared with first embodiment in which Vsync and Hsync are used as references.

Where there are a plurality of active spaces as shown in FIG. 6, the active space setting unit 8 according to the second embodiment identifies the position of each active space with reference to the point of origin of DE 32. Since the active spaces normally have the identical width, the parameters indicating the starting line of the active space and the height of the active space increase in association with the number of active spaces.

Third Embodiment

A summary of the third embodiment will be given. Like the moving image processing device 100 according to the first and second embodiments, the moving image processing device 100 according to the third embodiment acquires frame data in which a parallax image for the left eye and a parallax image for the right eye are arranged across an active space. The moving image processing device 100 identifies the position of an active space within the frame data and sets the pixel values of the active space at predetermined fixed values. The third embodiment differs from the first embodiment or the second embodiment in that the device identifies the position of an active space by referring to a database that maps video format identification codes (hereinafter referred to as "VIC"), which are video identification signals defined in accordance with the size of a parallax image, to the positions of active spaces within frame data. Hereinafter, the description that is a repetition from the first embodiment will be omitted or simplified.

Figure 11:
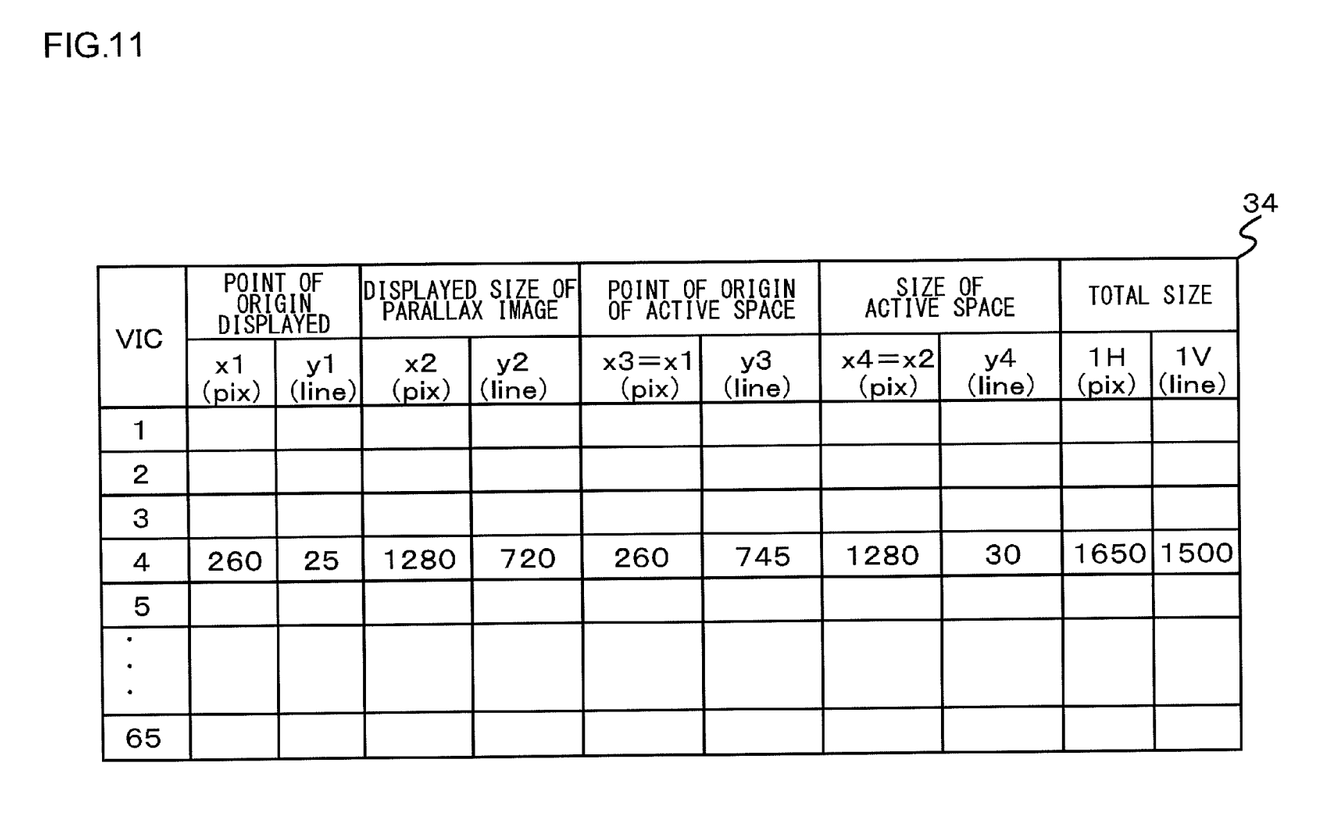
FIG. 11 shows a database for identifying the position of an active space according to the third embodiment.

FIG. 11 shows a database for identifying the position of an active space according to the third embodiment. Referring to FIG. 11, "pix" and "line" indicate "pixels" and "lines", respectively. A unique VIC (720p or 1080p) identifying the resolution of a video is attached to the data in compliance with the HDMI1.4a standard. The HDMI1.4a standard defines the size or position of an active space for each resolution of the video. While there are a plurality of types of VIC, FIG. 11 shows the case where VIC=4 by way of example. Numerals in FIG. 11 indicate coordinates with the starting point of Vsync and Hsync as the point of origin.

The active space setting unit 8 identifies the position of an active space by referring to the database 34 that maps VICs to the positions of active spaces within frame data. In the third embodiment, the only parameter required for the active space setting unit 8 to identify the position of an active space is VIC. As such, the third embodiment requires fewer parameters than the first or second embodiment.

The database 34 is stored in a storage area (not shown) in the moving image processing device 100 and can be updated. This addresses an increase in the types of VIC or change in the positions of active spaces occurring when, for example, the standard is updated.

When there are a plurality of active spaces as shown in FIG. 6, the database 34 stores the positions of the active spaces, linking the positions to VICs.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A moving image processing device comprising:
   a frame data acquisition unit configured to acquire frame data in which a parallax image for the left eye and a parallax image for the right eye are arranged across an active space;
   an image processing unit configured to subject the frame data to image processing; and
   an active space setting unit configured to identify the position of the active space processed by the image processing unit and to set the pixel values of the active space to be fixed values,
   wherein the position of the active space is determined using a vertical synchronization signal and a horizontal synchronization signal,
   wherein the fixed active space values are used to display the parallax image regardless of a distorted active space value that is determined during image processing, and
   wherein the active space setting unit sets the pixel values of the active space to be fixed values after the image processing unit has subjected the frame data to image processing.

2. The moving image processing device according to claim 1, wherein the active space is a rectangular area sharing a side with the parallax image for the left eye and a side with the parallax image for the right eye, respectively, and a horizontal blank and a vertical blank are provided around the frame data, the active space setting unit successively processes the frame data in units of pixels and identifies the position of the active space based on a data-enabled signal indicating that pixels of the frame data are input, the length of the parallax image, and the length of a side of the active space.

3. The moving image processing device according to claim 1, further comprising:
    a database configured both to store a video identification signal, defined according to the size of the parallax image for the left eye and the size of the parallax image for the right eye, and to store the position of the active space within the frame data, mapping the video identification signal to the position, and wherein the active space setting unit identifies the position of the active space by acquiring the video identification signal and referring to the database.

4. A moving image processing method configured to cause a process to perform a process comprising:
    acquiring frame data in which a parallax image for the left eye and a parallax image for the right eye are arranged across an active space;
    subjecting the frame data to image processing;
    and identifying the position of the active space in the frame data subjected to image processing and setting the pixel values of the active space to be a fixed value for all frame data subject to image processing.
    wherein the position of the active space is determined using a vertical synchronization signal and a horizontal synchronization signal, and
    wherein the pixel values of the active space are set to be fixed values the frame data as been subjected to image processing.

5. A computer program embedded in a non-transitory computer-readable recording medium, comprising:
    a module to acquire frame data in which a parallax image for the left eye and a parallax image for the right eye are arranged across an active space;
    a module to subject the frame data to image processing; and
    a module configured to identify the position of the active space in the frame data subjected to image processing and to set the pixel values of the active space to be fixed values,
    wherein the pixel values of the active space are set after image processing to avoid distortion of the active space,
    wherein the position of the active space is determined using a vertical synchronization signal and a horizontal synchronization signal, and
    wherein the pixel values of the active space are set to be fixed values the frame data has been subjected to image processing.

* * * * *